Nov. 24, 1925.
W. J. BARGEN ET AL
1,563,145
SEAT
Original Filed Feb. 14, 1924
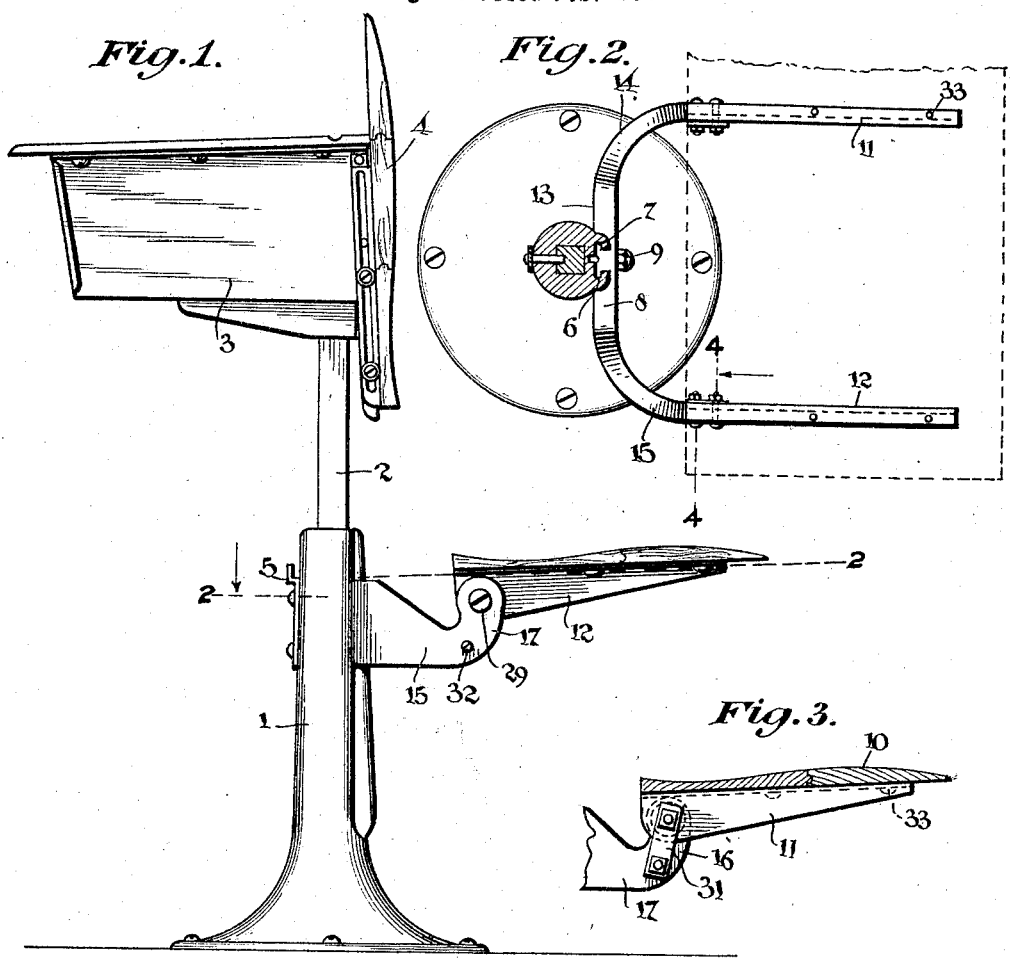
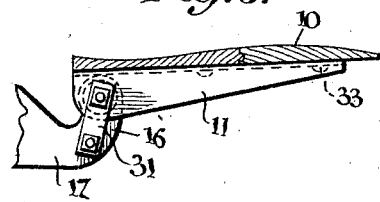
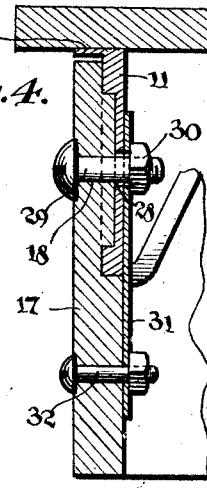
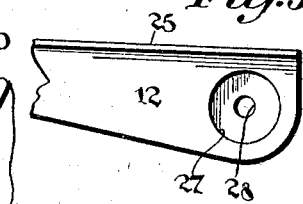
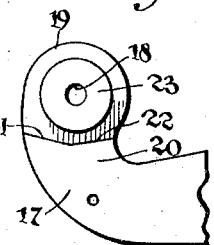
INVENTORS
William J. Bargen,
BY William R. Brennan,
Geo. P. Kimmel ATTORNEY.

Patented Nov. 24, 1925.

1,563,145

UNITED STATES PATENT OFFICE.

WILLIAM J. BARGEN AND WILLIAM R. BRENNAN, OF MISSOULA, MONTANA.

SEAT.

Original application filed February 14, 1924, Serial No. 746,066. Divided and this application filed September 9, 1924. Serial No. 736,735.

*To all whom it may concern:*

Be it known that we, WILLIAM J. BARGEN and WILLIAM R. BRENNAN, citizens of the United States, residing in the city and county of Missoula and State of Montana, have invented certain new and useful Improvements in Seats, of which the following is a specification.

This invention relates to a seat, is a division of our application 746,066 filed Feb. 14, 1924, and is designed primarily for use in connection with desks for school rooms, but it is to be understood that a seat structure in accordance with this invention can be employed for any purpose for which it is found applicable, and the invention has for its object to provide, in a manner as hereinafter set forth, a seat having inherent means to form pivots to enable the convenient elevating and lowering of a seat member when occasion requires, as well as constituting stops for limiting such movement in either direction.

A further object of the invention is to provide, in a manner as hereinafter set forth a seat including a bracket and a pair of seat member supports connected thereto, said bracket and supports having co-acting inherent means to provide for the pivoting of the supports directly upon the bracket whereby the connections between the latter and the supports are not only relieved of all strain to increase the life thereof, but further prevents the riding of the supports on the connections.

Further objects of the invention are to provide, in a manner as hereinafter set forth, a seat which is comparatively simple in its construction and arrangement, strong, durable, thoroughly efficient in its use, readily assembled and inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be had which fall within the scope of the claims hereunto appended.

In the drawings wherein like reference characters denote corresponding parts throughout the several views:

Figure 1, is an elevation of an adjustable desk showing the adaptation with the pedestal thereof of a seat in accordance with this invention.

Figure 2, is a section on line 2—2 Figure 1.

Figure 3, is a fragmentary view, in longitudinal section, of the seat.

Figure 4, is a section on line 4—4 Figure 2.

Figure 5 is a fragmentary view, in elevation, looking towards the inner face of a seat member support.

Figure 6 is a fragmentary view, in elevation, looking towards the inner face of one of the arms of the supporting bracket of the seat.

Referring to the drawings in detail 1 denotes a pedestal, 2 a vertically adjustable support telescoping within the pedestal 1 and carrying a desk 3 provided with an adjustable front wall 4 which constitutes a seat back. Retaining means for securing the support 2 in its adjusted position is indicated at 5. The pedestal 1 has its front formed with a pair of angle-shaped oppositely disposed spaced flanges 6, which extend lengthwise of the pedestal 1. The foregoing elements are illustrated to show, by way of example, a support for the seat, and such elements form parts of the article of furniture disclosed in our application aforesaid, but it is obvious that a seat, in accordance with this invention, can be connected to any support to which it can be attached or secured.

The seat can be fixed or vertically adjusted, and is shown of the latter type, and for such purpose the flanges 6 extend into oppositely disposed angle-shaped grooves 7 formed in the rear face of the supporting bracket 8 of the seat. A retaining means 9 is provided for detachably securing the bracket 8 in its adjusted position.

The seat, in accordance with this invention, not only comprises the bracket 8, but also a seat member 10, fixedly secured to a pair of spaced parallel supports 11, 12. which are connected to and pivotally supported by the bracket 8.

The bracket 8 comprises a yoke-shaped body portion consisting of an intermediate part 13 and a pair of forwardly extending curved end parts 14, 15 gradually decreasing in height forwardly and terminating in vertically disposed arms 16, 17 respectively.

Each arm 16, 17 has an opening 18 near its upper end. The upper portion of each arm 16, 17, is of less thickness than the lower portion thereof, as indicated at 19, and at the point of joinder of the lower part 20 of an arm with the reduced portion 19 a pair of oppositely extending inclined shoulders 21, 22 are provided on the inner face of the arm a substantial distance below the opening 18. The inner face of the reduced portion 19 of each arm is formed with a circular enlargement 23 which constitutes a pivot for the rear end of a seat member support. The opening 18 extends through the enlargement 23.

Each seat member support consists of a tapered bar formed with a rounded lower rear corner 24, provided at its top with an outwardly projecting lengthwise extending flange 25. The outer face of the support, at its inner or enlarged end 26 is formed with a circular socket 27 into which extends a circular enlargement 23. The side wall of the socket 27, in connection with the enlargement provides a pivot or hinge between an arm 16 or 17 and a seat member support 11 or 12. The rear end of each support 11 or 12 is formed with an opening 28 arranged at the axis of the socket 27 and which registers with opening 28, see Figure 4. Extending through the registering openings is a headed bolt 29 which projects inwardly of a seat support and carries a securing nut 30. Mounted on and depending from each bolt 29 is a strap 31, which has its lower end connected by a holdfast device 32 to an arm 16 or 17.

The shoulders 21, 22 incline downwardly towards the vertical center of the portion 19. The shoulders 21 limit the elevating movement of the seat member supports, as well as forming means to maintain the supports in a vertical position. The shoulders 22 limit the downward movement of the seat member supports, as well as forming means to maintain the supports in horizontal position.

The seat member 10 is secured upon the top edges of the supports 11, 12 by holdfast devices 33 carried by the flanges 25.

It is thought that the many advantages of a hinged or pivoted seat set up in accordance with this invention can be readily understood from the foregoing description, taken in connection with the accompanying drawings, and although the preferred embodiment of the invention is as shown and described, yet it is to be understood that changes in the details of construction can be had which will fall within the scope of the invention as claimed.

What we claim is:—

1. In a seat a horizontally disposed yoke-shaped supporting bracket provided at each end with a vertically disposed arm having one face formed with a circular enlargement and a pair of oppositely extending stop shoulders below the enlargement, a pair of seat member supports each having one face at its rear formed with a circular socket extending around an enlargement, said enlargements in connection with the side walls of said sockets providing pivots for said supports, and means for connecting the rear end of said supports to the upper end of said arms, each pair of shoulders extending transversely of an arm and inclining downwardly towards the vertical center of the arm.

2. In a seat a horizontally disposed yoke-shaped supporting bracket provided at each end with a vertically disposed arm having one face formed with a circular enlargement and a pair of oppositely extending stop shoulders below the enlargement, a pair of seat member supports each having one face at its rear formed with a circular socket extending around an enlargement, said enlargements in connection with the side walls of said sockets providing pivots for said supports, and means for connecting the rear end of said supports to the upper end of said arms, each pair of shoulders extending transversely of an arm and inclining downwardly towards the vertical center of the arm, and each of said supports having its rear lower corner rounded.

In testimony whereof, we affix our signatures hereto.

WILLIAM R. BRENNAN.
WILLIAM J. BARGEN.